United States Patent
Matsuda et al.

(10) Patent No.: US 6,394,210 B2
(45) Date of Patent: May 28, 2002

(54) TEMPERATURE CONTROLLER FOR VEHICULAR BATTERY

(75) Inventors: Kenji Matsuda; Toyotaka Hirao; Hiroshi Mizutani, all of Nakamura-ku (JP); Gregory A. Major, Beverly Hills; June Bian, Novi, both of MI (US)

(73) Assignees: Mitsubishi Heavy Industries, Ltd., Tokyo (JP); General Motors Corporation, Detroit, MI (US)

( * ) Notice: Subject to any disclaimer, the term of this patent is extended or adjusted under 35 U.S.C. 154(b) by 0 days.

(21) Appl. No.: 09/326,601

(22) Filed: Jun. 7, 1999

(51) Int. Cl.$^7$ .............................. B60K 11/00; B60K 1/00
(52) U.S. Cl. ..................... 180/68.1; 180/65.1
(58) Field of Search ................ 180/68.1, 68.2, 180/68.4, 68.5, 65.1; 165/41, 42, 43; 237/12.3 R, 12.3 B; 310/58–64

(56) References Cited

U.S. PATENT DOCUMENTS

| | | | | |
|---|---|---|---|---|
| 4,335,429 A | * | 6/1982 | Kawakatsu ................. 364/424 |
| 5,291,960 A | * | 3/1994 | Brandenburg et al. ..... 180/65.2 |
| 5,432,026 A | * | 7/1995 | Sahm et al. ................. 429/120 |
| 5,483,807 A | * | 1/1996 | Abersfelder et al. .......... 62/435 |
| 5,497,941 A | * | 3/1996 | Numazawa et al. ........ 237/2 A |
| 5,537,956 A | * | 7/1996 | Rennfeld et al. ........ 123/41.29 |
| 5,678,760 A | * | 10/1997 | Muso et al. ................. 237/2 A |
| 5,824,432 A | * | 10/1998 | Currle ......................... 429/120 |
| 5,839,656 A | * | 11/1998 | Yamano et al. ........ 237/12.3 B |
| 5,898,282 A | * | 4/1999 | Drozdz et al. .............. 318/139 |
| 5,937,664 A | * | 8/1999 | Matsumo et al. .......... 62/259.2 |

* cited by examiner

Primary Examiner—Brian L. Johnson
Assistant Examiner—Gerald Klebe
(74) Attorney, Agent, or Firm—Oblon, Spivak, McClelland, Maier & Neustadt, P.C.

(57) ABSTRACT

The invention provides a temperature controller for a vehicular battery which uses the waste heat of the engine to control the temperature of a high temperature battery, to thereby enable miniaturization of the vehicle and energy savings, and which can accurately control the high temperature battery to an optimum efficiency temperature.

The battery temperature controller comprises: a heat exchanger 11 for removing waste heat from a vehicle engine 3; a heating loop K being a coolant circulation path for conveying heat from the heat exchanger 11 to a vehicle high temperature battery 5; a radiator 9 for cooling the high temperature battery 5; a cooling loop R being a coolant circulation path for carrying heat from the high temperature battery 5 to the radiator 9, and connected in parallel with the heating loop K so as to have a common path C, and a first flow control valve 60 and a second flow control valve 61 respectively provided in the heating loop K and the cooling loop R.

6 Claims, 6 Drawing Sheets

TEMPERATURE CONTROLLER FOR VEHICULAR BATTERY

BACKGROUND OF THE INVENTION

1. Field of the Invention

The present invention relates to a battery temperature controller for controlling the temperature of a vehicular battery.

2. Description of the Related Art

Recently, there has been an increasing demand for introducing a low-pollution vehicle and alternative energy vehicle, accompanied with demands for improving the air environment and environmental problems. As a strong candidate for the alternative energy vehicle, there is the hybrid vehicle which uses an electric motor together with an engine. A hybrid vehicle is driven by an engine at the time of high speed driving, and is driven by a drive motor with a battery as a power source at the time of low speed driving. The battery is charged by driving an electric power generation motor at the time of engine driving.

As the battery for the hybrid vehicle, there is for example the lead acid battery, the alkaline storage battery, the metal air storage battery, and the high temperature battery. Of these, the high temperature battery operates stably within a high temperature range (for example 80~90° C.), operating with high efficiency to thereby improve vehicle fuel consumption. That is to say, the high temperature battery of a hybrid vehicle has an optimum efficiency temperature (the influence of temperature on the efficiency is greater than for the conventional lead acid battery) greater than atmospheric temperature, and hence it is desirable to maintain the temperature at around 80° C. in consideration of electric generating and storage efficiency and vehicle fuel consumption. As an example of a high temperature battery, there is one which uses a halide of for example copper, nickel, or silver, for the positive electrode, and metallic lithium (alternatively an activated metal such as calcium, magnesium is also possible) for the negative electrode, and employs an organic substance such as propylene carbonate for the electrolyte.

Since it is necessary to mount a heat source for maintaining the temperature of the high temperature battery, on the vehicle, then there is the problem of an increase in vehicle cost and battery cost, and an increase in vehicle size due to the space for mounting the heat source for the battery.

Moreover, since a cooling device is not provided solely for the heat source, then the temperature of the high temperature battery cannot be accurately controlled to an optimum efficiency temperature. Hence there is room for improvement in the efficiency for electricity generation and for electricity storage and in fuel consumption of the vehicle.

SUMMARY OF THE INVENTION

The present invention addresses the above problems with the conventional technology with the object of providing a temperature controller for a vehicular battery which uses the waste heat of the engine to heat the high temperature battery, to thereby enable miniaturization of the vehicle and energy savings.

Moreover, another object of the invention is to provide a temperature controller for a vehicular battery which can accurately control the temperature of the high temperature battery to an optimum efficiency temperature.

The temperature controller for a vehicular battery of the present invention, to achieve the above object, comprises a heat exchanger for removing waste heat from a vehicle engine, and a heating loop, being a coolant circulation path, for carrying heat from the heat exchanger to a high temperature battery of a vehicle.

With this invention, the waste heat of the engine is used to maintain the temperature of the high temperature battery, and hence it is not necessary to mount a new heat source in the vehicle. Consequently, miniaturization of the vehicle and energy saving can be achieved.

Furthermore, according to a second aspect of the invention, there is provided; a radiator for cooling the high temperature battery, a cooling loop being a coolant circulation path, for carrying heat from the high temperature battery to the radiator, and connected in parallel with the heating loop so as to have a common path with the heating loop, and a flow control device for the heating loop and the cooling loop.

With this invention, at first at the time of vehicle heating, the heating loop and the cooling loop are respectively in the open condition and the closed condition so that high temperature coolant which has been heated by the engine waste heat in the heat exchanger is circulated in the heating loop to heat the high temperature battery so as to quickly attain the warm-up condition in the high temperature region. After this, in the case where the temperature of the high temperature battery goes above the optimum efficiency temperature, the cooling loop is adjusted so as to open gradually so that low temperature coolant which has given up heat in the radiator is circulated in the cooling loop and mixed with coolant in the heating loop to give a high temperature coolant mixture. Coolant at a fixed temperature is then supplied to the high temperature battery. In this way, the high temperature battery can be operated at an optimum efficiency point.

Here, with a third aspect, for the flow control device, flow control valves may be respectively provided in the heating loop and the cooling loop.

Moreover, instead of respectively providing flow control valves in the heating loop and the cooling loop, a three way valve may be provided at the junction portion of the heating loop and the cooling loop so that the abovementioned temperature control can be effected by operating a single three way valve.

DESCRIPTION OF THE PREFERRED EMBODIMENT

Next is a description of an embodiment of a temperature controller for a vehicular battery, with a hybrid vehicle given as an example.

Figure 1:
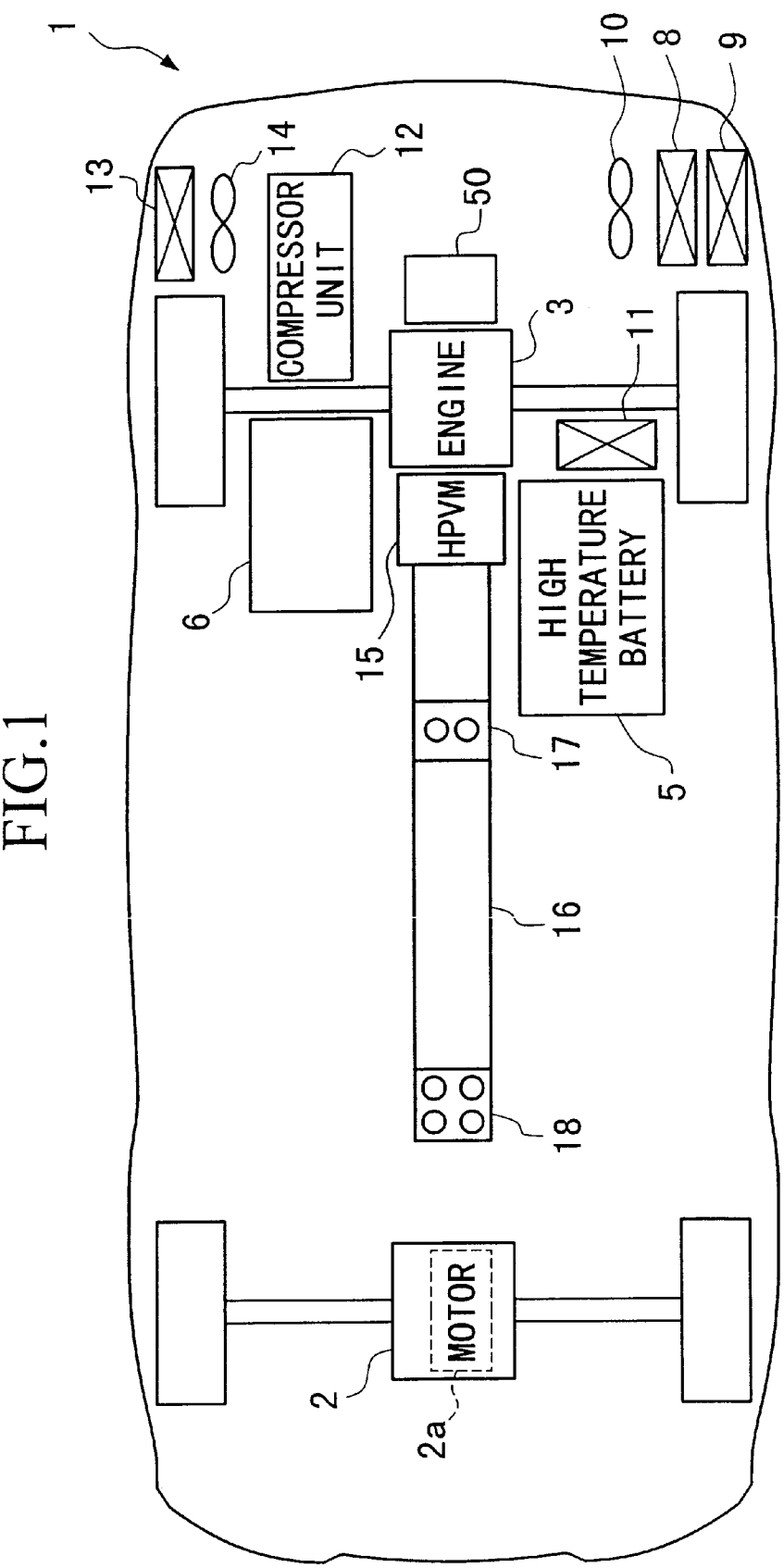
FIG. 1 is a diagram showing an arrangement of a hybrid vehicle according to the present invention.

At first, as shown in FIG. 1, numeral 1 denotes a hybrid vehicle, equipped with a drive unit 2 (apparatus to be cooled) in the front part of the vehicle having a motor 2a housed therein for driving front wheels, and an engine 3 (a turbocharged engine in this example, but not limited to this) in the rear part of the vehicle for driving rear wheels. The hybrid vehicle 1 runs at the time of low speed driving, using the driving motor 2a as a drive source, while above a fixed speed the drive source is changed to the engine 3 for running. Since the motor 2a is provided in the front part of the vehicle, the engine 3 is arranged in the rear part of the vehicle, for the reason of mounting space and in consideration of air resistance. There is also the case where the engine 3 and the motor 2a are activated as the drive source at the same time.

Numeral 5 denotes a battery (apparatus to be cooled) which is a power source for the motor 2a, and numeral 6 denotes a motor-generator unit (apparatus to be cooled) for converting the driving force of the engine 3 into electrical power and storing the electrical power in the battery 5. An electrical power generation motor (not shown) is mounted in the motor-generator unit 6, and electrical power is generated by transmitting the driving force of the engine 3 to the electrical power generation motor. Moreover, the motor-generator unit 6 has the function of converting electrical power stored in the battery 5 into the driving force, by driving the electrical power generation motor with the electrical power. Here the battery 5 of this example is a high temperature battery of the liquid heated type which is stable in a high temperature range (for example 80° C.~90° C.) with a high operating efficiency. As an example of a high temperature battery, there is one which uses a halide of for example copper, nickel, or silver, for the positive electrode, and metallic lithium (alternatively an activated metal such as calcium, magnesium is also possible) for the negative electrode, and employs an organic substance such as propylene carbonate for the electrolyte.

Numeral 50 denotes an I/C (intercooler) EGR system (apparatus to be cooled). This system 50 is provided with an EGR (Exhaust Gas Recirculation) unit 50a, and an intercooler 50b. That is to say, the engine 3 is provided with an EGR (Exhaust Gas Recirculation) unit 50a for reintroducing a part of the exhaust gas back into the engine 3 to thereby reduce the NOx in the exhaust gas. In addition an intercooler 50b is provided between a turbo charger (not shown in the figure) and an intake manifold (not shown in the figure) for reducing the intake temperature. The EGR 50a and the intercooler 50b are both liquid cooled types.

As shown in FIG. 1, numeral 8 denotes a first radiator for cooling the engine 3, and 9 denotes a second radiator provided together with the first radiator 8. The second radiator 9 is for cooling the high temperature battery 5, the driving motor 2a, the motor-generator unit 6 and the I/C EGR system 50. The first radiator 8 and second radiator 9 are so constructed that heat is discharged to the surrounding air by a fan 10 for the cooling radiators. Moreover, there is provided a battery heat exchanger 11 (coolant heating device) for transferring heat from the engine 3 to the high temperature battery 5.

Next is a description of a vehicle air conditioning apparatus (referred to hereunder as an air conditioner) mounted in the hybrid vehicle 1.

Figure 3:
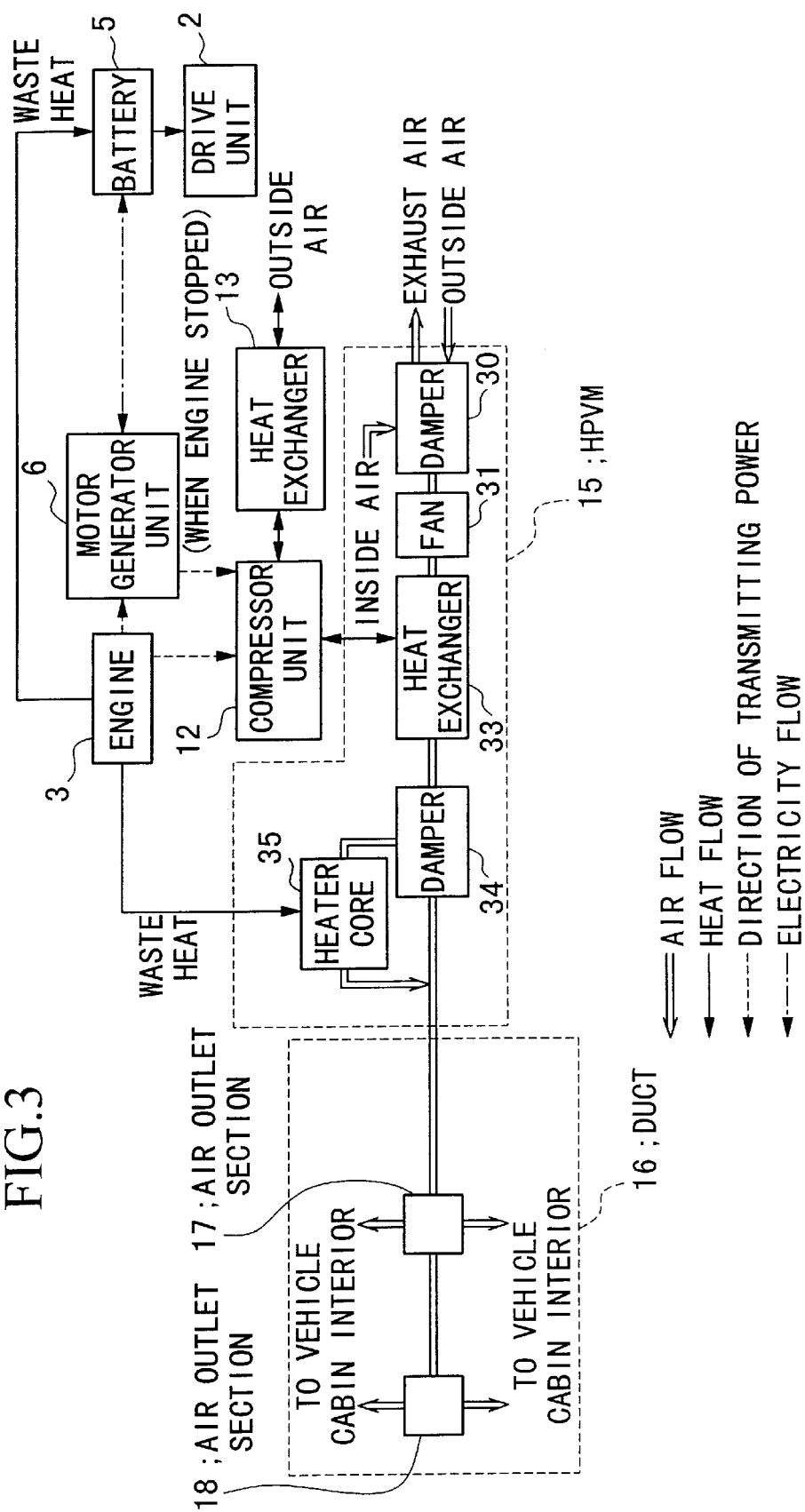
FIG. 3 is a block diagram of the hybrid vehicle.

In FIG. 1, numeral 12 denotes a compressor unit for compressing a refrigerant, 13 denotes a heat exchanger, 14 denotes a fan for blowing air to the heat exchanger 13, and 15 denotes a module referred to as an HPVM (Heat Pump Ventilating Module). The heat exchanger 13 is provided on the right side of the vehicle body for facilitating heat exchange with outside air, and heat is forcibly exchanged with outside air by the fan 14. The HPVM 15 is arranged in the middle of the rear part of the vehicle body, and is connected to a duct 16 extending to the front of the vehicle body along a center of the lower part of the vehicle body. As shown in FIG. 3, the duct 16 is formed in a tubular shape, and is provided with air outlet sections 17 and 18 in the central portion and in the front end of the duct 16, respectively.

The HPVM 15 will now be described in detail.

Figure 2:
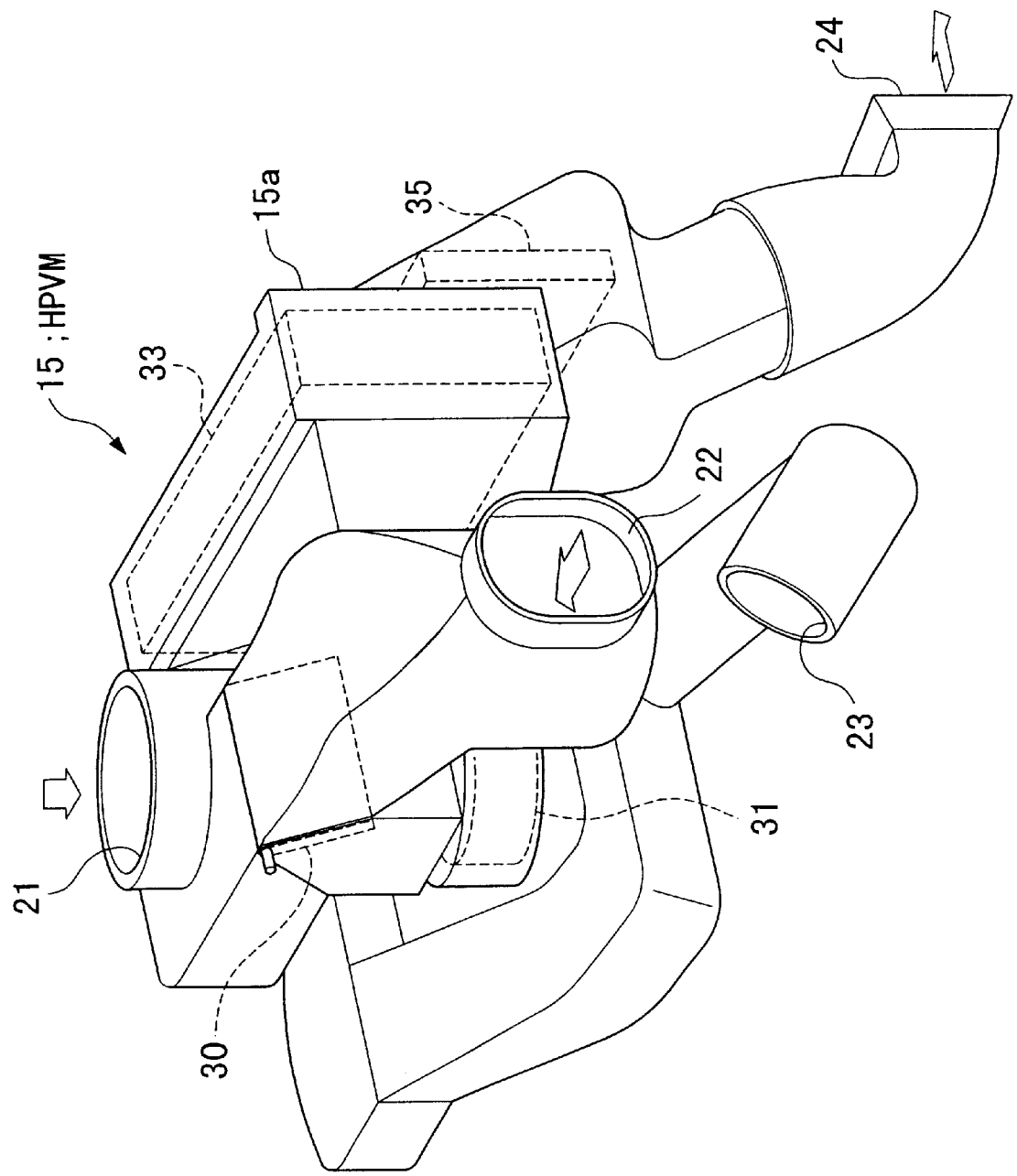
FIG. 2 is a perspective view of an HPVM mounted in the hybrid vehicle.

FIG. 2 shows a perspective view of the HPVM 15, and FIG. 3 shows a block diagram of the air conditioner.

In FIG. 2, the HPVM 15 is constructed with a casing, 15a, an inside air intake 21, an outside air intake 22, a discharge port 23 and a connecting portion 24 for connecting the HPVM to the duct 16. The inside air intake 21 is communicated with the vehicle cabin, and the outside air intake 22 and the discharge port 23 are communicated with outside of the vehicle cabin.

Moreover, as shown in FIG. 3, the HPVM 15 is equipped with an inside air/outside air changeover damper 30 for determining which of either air inside of the vehicle cabin (inside air) or air outside of the vehicle cabin (outside air) is to be drawn in, a fan 31 for introducing air via the inside air/outside air changeover damper 30, a heat exchanger 33 for exchanging heat between the introduced air and the refrigerant, an air mix damper 34 for branching a part of the heat exchanged air, and a heater core 35 for heating the branched air.

By opening or closing the inside air/outside air changeover damper 30, it is possible to select either one of an inside air circulating operation for drawing in inside air from the inside air intake 21 (see FIG. 2) and sending the air to the duct 16, or an outside air introducing operation for introducing outside air from the outside air intake 22 (see FIG. 2) and sending the air to the duct 16, as well as discharging inside air from the discharge port 23 (see FIG. 2).

The heater core 35 is a heat exchanger for receiving a supply of high temperature coolant from the engine 3, as described below, and heating a flow of introduced air. This is used supplementarily at the time of the heating operation (heat pump operation) of the air conditioner. The air mix damper 34 is for adjusting the quantity of introduced air branched off to the heater core 35, according to the opening thereof. The introduced air is then blown to the vehicle cabin from the air outlet sections 17 and 18 of the duct 16.

Figure 4:
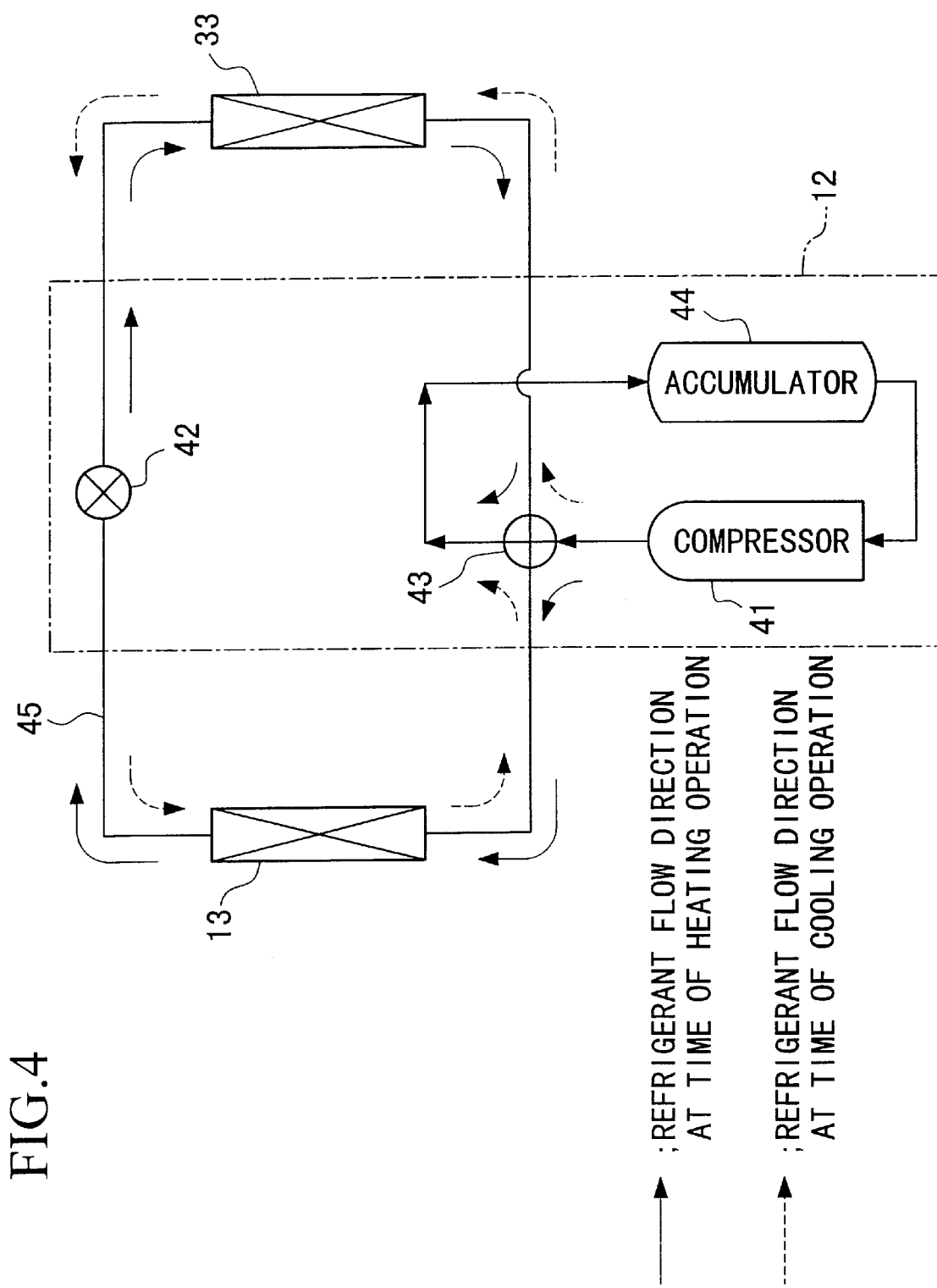
FIG. 4 is a diagram showing a refrigerant path of an air conditioner mounted in the hybrid vehicle.

The cooling operation or heating operation is effected by supplying refrigerant to the heat exchanger 33 and the heat exchanger 13 by the compressor unit 12. FIG. 4 shows the compressor unit 12.

As shown in FIG. 4, the compressor unit 12 includes, as main components, a compressor 41, a throttling resistance 42, a four way valve 43 and an accumulator 44. The above described heat exchangers 13 and 33 are connected between these respective devices by a refrigerant path 45 to form a refrigerant circuit.

A driving force is transmitted to the compressor 41 by the engine 3 or the motor-generator unit 6. The compressor 41 has the function of compressing the refrigerant which has absorbed heat and been gasified in an evaporator, and discharging and sending the refrigerant as a high temperature and high pressure gas refrigerant to the four way valve 43. By switching the four way valve 43, the flow direction of the high temperature and high pressure gas refrigerant discharged from the compressor 41 is changed, resulting in changeover of the cooling or heating operation. Moreover, the throttling resistance 42 has the function of decompressing and expanding the high temperature and high pressure liquid refrigerant to give a low temperature and low pressure liquid refrigerant. This uses a capillary tube or an expansion valve. The accumulator 44 is provided for removing the liquid component contained in the gas refrigerant, so as to prevent a part of the liquid refrigerant which has not been evaporated completely by the evaporator from being drawn in directly to the compressor 41.

With the above described refrigerant circuit, at the time of the heating operation, the low temperature and low pressure liquid refrigerant is evaporated and gasified in the heat exchanger 33 (which operates as a condenser at the time of cooling) by absorbing heat from outside air, to become a low temperature and low pressure gas refrigerant, and is then sent to the compressor 41 and is compressed into a high temperature and high pressure gas refrigerant. Thereafter, in the heat exchanger 13 (which operates as an evaporator at the time of cooling) the gas refrigerant releases heat to heat the air and is condensed and liquefied, after which it is expanded by passing through the throttling resistance 42 to become a low temperature and low pressure liquid refrigerant, and is circulated again to the heat exchanger 33. In this case, the heat exchanger 33 operates as an evaporator and cools the heating medium. Moreover, the heat exchanger 13 functions as a condenser and heats the refrigerant.

At the time of the cooling operation, the high temperature and high pressure gas refrigerant supplied to the heat exchanger 33 is condensed and liquefied by discharging heat to the outside air. This is then expanded by the throttling resistance 42, and sent to the heat exchanger 13 to be evaporated and gasified, and is then sent to the compressor 41 and is again circulated to the heat exchanger 33. In this case, the heat exchanger 33 functions as a condenser and the heat exchanger 13 functions as an evaporator. That is to say, one of the heat exchangers of the cooling apparatus arranged in the air conditioner, by switching the four way valve, operates as an evaporator to demonstrate a cooling ability, and may also operate as a condenser to function as a heater. When operated as an evaporator, cooling, dehumidifying and temperature adjustment is possible, while when operated as a heater, this can act in place of the heater core. Therefore, even when the engine cooling water temperature is low so that there is no heating effect, heating ability can be demonstrated. Moreover, this supplementary heating operation immediately after starting the engine operation naturally has a sufficient heating ability for when driving under electrical power, without using the engine.

With the above construction, for safe operation it is required that the temperature of the above described drive unit 2 and the motor-generator unit 6 is not higher than 65° C. Moreover, the temperature of the high temperature battery 5 is ideally 85±5° C. from the view point of storage efficiency. To satisfy this requirement, in the hybrid vehicle 1, the temperature of the coolant is controlled as described below.

Figure 5:
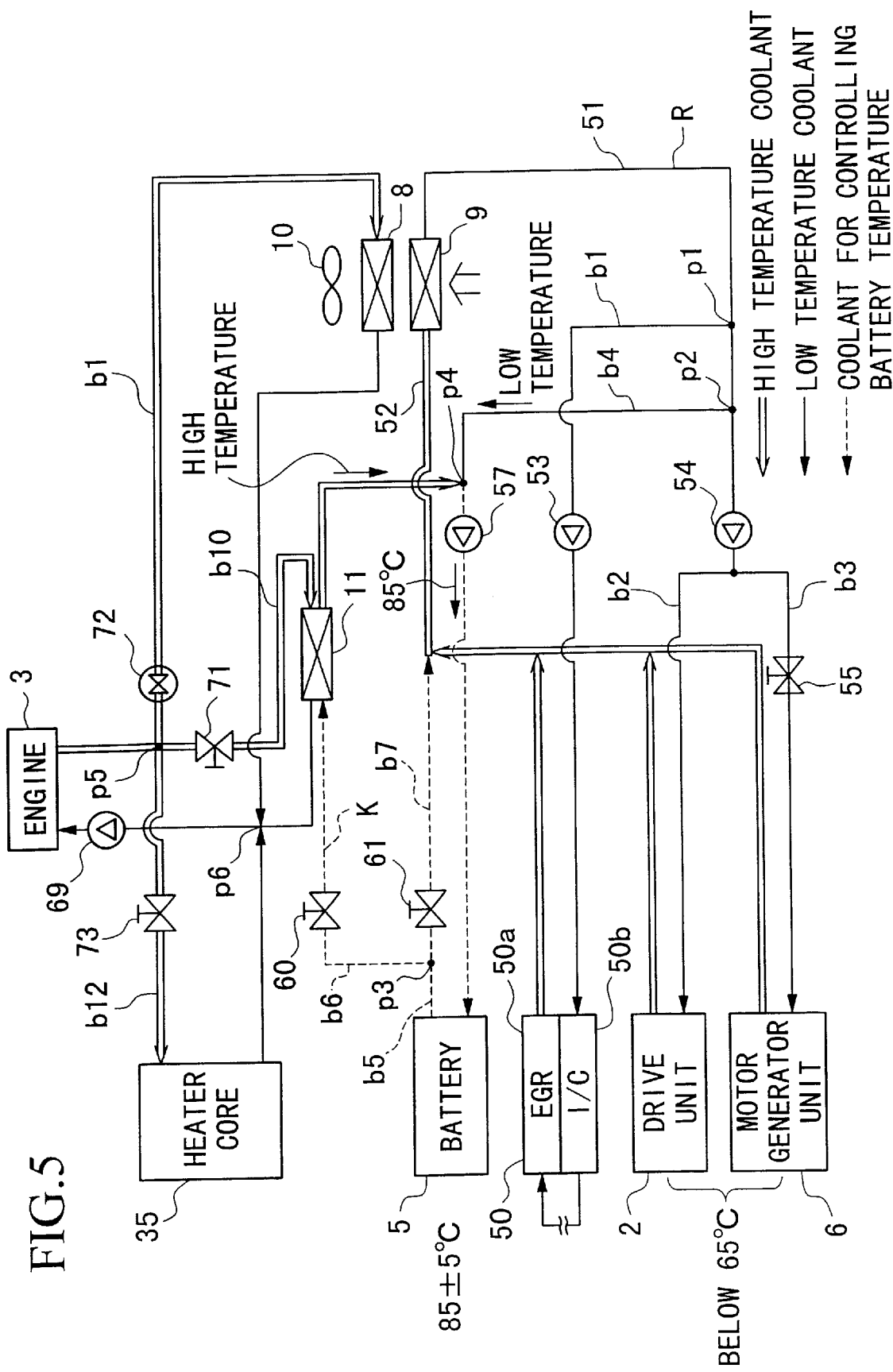
FIG. 5 is a diagram showing the flow of coolant in the hybrid vehicle.

As shown in FIG. 5, there are formed predetermined flow paths for flowing a coolant between the engine 3, the high temperature battery 5, the I/C EGR system 50, the drive unit 2, the motor-generator unit 6, the first radiator 8, the second radiator 9 and the battery heat exchanger 11.

The engine 3 is cooled by the first radiator 8, and the high temperature battery 5, the I/C EGR system 50, the drive unit 2 and the motor-generator unit 6 are cooled by the second radiator 9.

Next is a detailed description of the flow path.

The I/C EGR system 50, the drive unit 2 and the motor-generator unit 6 are cooled by a coolant supplied from the second radiator 9.

First, the coolant is supplied from the outlet side of the second radiator 9 to the flow path 51. The coolant is branched, at a branch point p1, to the I/C EGR system 50 side and the drive unit 2 and motor-generator unit 6 side.

The coolant branched to the I/C EGR system 50 side is supplied into the I/C EGR system 50 via an inter-cooler coolant pump 53 (circulation quantity control device) interposed in a flow path b1. After cooling the apparatus system in the I/C EGR system 50, the coolant is again circulated to the second radiator 9 via a flow path 52. At this time, a flow velocity is given to the coolant by the inter-cooler coolant pump 53 to make the coolant flow in the flow path b1.

On the other hand, the coolant branched to the drive unit 2 and the motor-generator unit 6 side is further branched at a branch point p2, after which a part of the coolant is further branched via a traction coolant pump 54 (circulation quantity control device). One part is branched to a flow path b2 on the drive unit 2 side, and the other is branched to a flow path b3 on the motor-generator unit 6 side. The coolant after branching is supplied to the drive unit 2 and the motor-generator unit 6, respectively, similar to the coolant supplied to the I/C EGR system 50, for cooling the apparatus system, and is then again circulated to the second generator 9 via the flow path 52. At this time, a flow velocity is given to the coolant by the traction coolant pump 54 to make the coolant flow in the flow paths b2 and b3.

Here, the drive unit 2 is disposed in the front part of the vehicle body, as shown in FIG. 1. On the other hand, the motor-generator unit 6 and the second radiator 9 are disposed in the rear part of the vehicle body. That is, the flow path b2 is longer than the flow path b3, and has a larger coolant flow resistance. Therefore, when it is necessary to make the coolant flow to both the drive unit 2 and the motor-generator unit 6, the flow rate on the motor-generator unit 6 side becomes higher than that on the drive unit 2 side, resulting in uneven balance. To solve this problem, a flow regulating valve 55 is interposed in the flow path b3 to maintain the flow rate balance with the flow path b2.

The other coolant branched at the branch point p2 flows to the high temperature battery 5 side in a flow path b4 in which a battery coolant pump 57 (circulation quantity control device) is interposed.

At a junction p4 before the battery coolant pump 57, this merges with a high temperature coolant heated by the heat of the engine 3. The high temperature coolant will be described later. The flow rate is adjusted beforehand so that after merging, the coolant attains a predetermined temperature (85±5° C.).

Thereafter, the coolant is supplied to the high temperature battery 5, and discharged to the outlet flow path b5, while maintaining the high temperature battery 5 within the above described predetermined temperature. The coolant is branched at a branch point p3 to flow paths b6 and b7. The construction is such that the flow path b6 passes through the battery heat exchanger 11 and joins the flow path b4 at the junction p4, and the flow path b7 joins the flow path 52 and is then circulated again to the second radiator 9. A first flow regulating valve 60 is interposed in the flow path b6, and a second flow regulating valve 61 is interposed in the flow path b7. The flow regulating valves 60 and 61 will be described later.

The coolant flowing in the flow path b6 is heated by the heat of the engine 3 in the battery heat exchanger 11. In more detail, in the battery heat exchanger 11, heat is exchanged between the flow path b6 and the flow path b10 which circulates the coolant between the engine 3 and the battery heat exchanger 11. Since the temperature of the coolant in the flow path b10 heated by the engine 3 is higher than that of the coolant in the flow path b6 (85±5° C.), the coolant in the flow path b6 is heated to become a high temperature coolant, and merges with the low temperature coolant in the flow path b4 at the junction p4.

Figure 7:
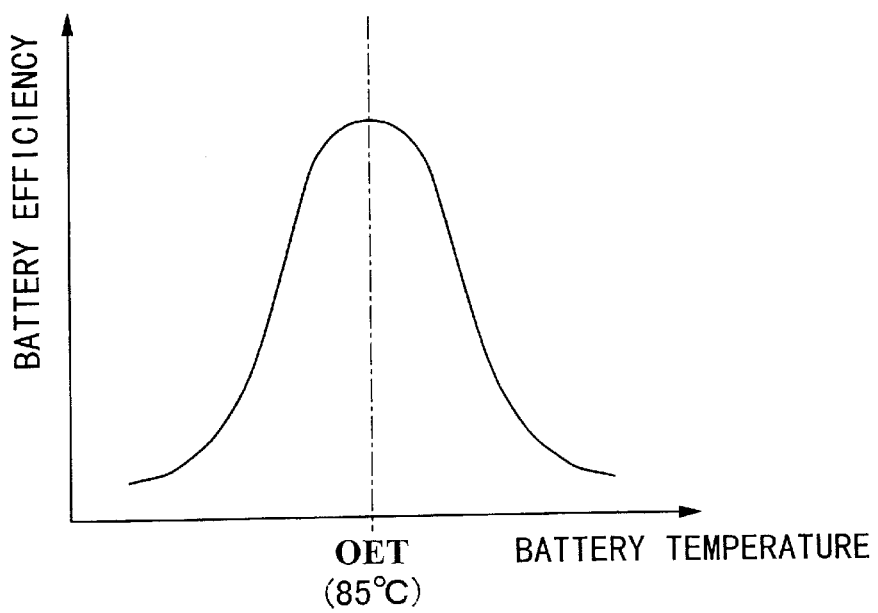
FIG. 7 is a graph showing a relationship between temperature of a high temperature battery and efficiency.

In this way, the high temperature coolant and the low temperature coolant merge at the junction p4, to thereby supply the above described coolant having a predetermined temperature to the high temperature battery 5. By adjusting the quantity of the high temperature coolant by the above described flow regulating valves 60 and 61, the temperature of the coolant supplied to the high temperature battery 5 is controlled to the optimum efficiency temperature OET (85° C.) as shown in FIG. 7.

A description of the characteristic parts of the embodiment will now be given.

Figure 6:
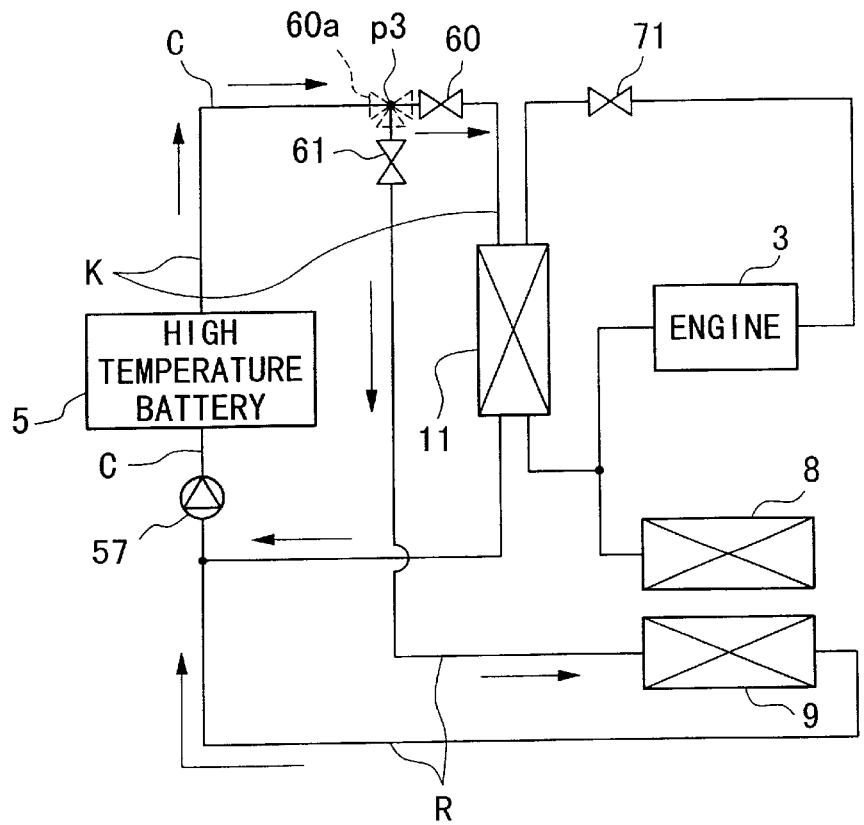
FIG. 6 is a schematic diagram of an embodiment of a temperature controller for a vehicular battery, of the present invention.

As shown in FIG. 5 and FIG. 6, the high temperature battery 5, the heat exchanger 11 and the circulation pump 57 are provided in a heating loop K (coolant circulation path) comprising the flow paths b5 and b6. The first flow control valve 60 is provided in the heating loop K. Opposite ends of a cooling loop R (coolant circulation path) comprising flow paths 51, 52, b4 and b7 are connected in parallel with the heating loop K so as to have a common path C. The second flow control valve 61 is provided in the cooling loop R. The flow control device comprises the first flow control valve 60 and the second flow control valve 61.

At the time of vehicle heating, the first flow control valve 60 and the second flow control valve 61 are respectively in the open condition and the closed condition, so that high temperature coolant which has been heated by the waste head from the engine 3 in the heat exchanger 11 is circulated in the heating loop K to heat the high temperature battery 5 so as to quickly attain the warm-up condition in the high temperature region. After this, in the case where the temperature of the high temperature battery 5 goes above the optimum efficiency temperature OET (85° C. in this embodiment as shown in FIG. 7), the second flow control valve 61 is adjusted so as to open gradually so that the low temperature coolant which has given up heat in the second radiator 9 is circulated in the cooling loop R and mixed with coolant in the heating loop K to give a high temperature coolant mixture. Coolant at a fixed temperature is then supplied to the high temperature battery. In this way, the high temperature battery can be operated at an optimum efficiency point.

The heat exchanger 11 is a plate type liquid heat exchanger which employs a liquid with a high specific heat capacity. This can be smaller than the conventional commonly used heating and cooling units using air.

Instead of respectively providing the flow control valves 60 and 61 in the heating loop K and cooling loop R, a three way valve (see broken lines 60a in FIG. 6) may be provided at the junction portion p3 of the heating loop K and the cooling loop R so that the abovementioned temperature control can be effected by operating a single three way valve 60a. Hence valve operation is simplified.

Another flow path b11 to the engine 3 is provided independent of the above described flow path b10, to circulate the coolant between the first radiator 8 and the engine 3. Moreover, a flow path b12 is provided to circulate the coolant between the heater core 35 and the engine 3.

The coolant discharged from the engine 3 is branched at a branch point p5 to flow paths b10, b11 and b12, and passes through the battery heat exchanger 11, the first radiator 8 and the heater core 35, respectively, after which it merges at the junction p6, and is then circulated again to the engine 3.

An engine coolant pump 69 is provided in the flow path on the inlet side of the engine 3, to make the coolant flow in flow paths b10~b12. Moreover, in the flow paths b10 and b12 there are provided flow regulating valves 71 and 73, respectively, and in the flow path b11 there is provided a thermostat 72.

The first radiator 8 and the above described second radiator 9 are provided in parallel, and since the coolant flowing through the first radiator 8 has a higher temperature, a pull (suction) type radiator cooling fan 10 is arranged on the downstream side of the first radiator 8, so that air passing through the second radiator 9 passes through the first radiator 8.

Next is a description of the operation of the above described air conditioner.

As described above, the hybrid vehicle 1 travels at the time of low speed driving, using the driving motor 2a as a drive source and travels at the time of high speed driving exceeding a certain speed, by switching the drive source to the engine 3. Hence, the drive source of the air conditioner is also different from that of the conventional vehicular air conditioner.

First, when the hybrid vehicle 1 travels using the engine 3, the compressor unit 12 is driven by the driving force from the engine 3 at the time of air conditioning, to circulate the refrigerant between the heat exchangers 13 and 33. The engine 3 also transmits a driving force to the motor-generator unit 6, and the motor-generator unit 6 generates electrical power by a motor (not shown), and stores the electrical power in the high temperature battery 5.

With the HPVM 15, the fan 31 introduces inside air or outside air via the inside air/outside air changeover damper 30 to blow air to the heat exchanger 33. The heat of the introduced air is exchanged with the refrigerant in the heat exchanger 33, to thereby be heated (at the time of the heating operation), or cooled (at the time of the cooling operation).

The air, after being heated is directed to the duct 16 or the heater core 35 by means of the air mix damper 34, and the introduced air sent to the heater core 35 is further heated by the waste heat of the engine 3 and then sent to the duct 16.

On the other hand, when the motor 2a is driving and the engine 3 is stopped, operation is as follows. That is, the motor-generator unit 6 drives the electrical power generating motor housed therein, using the electrical power stored in the high temperature battery 5. The driving force is transmitted to the compressor unit 12 to thereby circulate the refrigerant between the heat exchangers 13 and 33. Other operation is similar to that when the engine 3 is driving.

Next is a description of the coolant circulation. As shown in FIG. 6, the coolant discharged from the second radiator 9 is distributed via the flow path 51 to the various apparatus, branching at branch points p1 and p2. That is to say, the quantity of coolant circulated to the battery 5 is determined by the battery coolant pump 57, and the quantity of coolant circulated to the I/C EGR system 50 is determined by the intercooler coolant pump 53, and the quantity of coolant circulated to the drive unit 2 and the motor-generator unit 6 is determined by the traction coolant pump 54.

Next is a separate description of the coolant circulation for when the engine 3 is driving, and for when the motor 2a is driving.

When travelling using the engine 3, then as with the conventional engine vehicle, the coolant is circulated using the engine coolant pump 69, between the engine 3 and the first radiator 8, to thereby cool the engine 3. Moreover, the coolant is also circulated in the I/C EGR system 50 using the intercooler coolant pump 53.

With the motor-generator unit 6, when the electric power generating motor housed therein is driven, the coolant is circulated. That is to say, in the case of storing electricity using the drive power of the engine 3, and in the case of operating the air conditioner when the engine 3 is stopped, the coolant is circulated to the motor-generator unit 6 using the traction coolant pump 54, to thereby provide cooling.

On the other hand, when travelling by means of the motor 2a, the coolant is circulated to the drive unit 2 using the traction coolant pump 54 to thereby cool the drive unit 2.

Here, it is not necessary to cool the I/C EGR system 50 when the engine 3 is stopped. Consequently, it is not necessary to operate the inter-cooler coolant pump 53. Hence there is the case where when this pump is fully stopped, the coolant is made to flow back by the drive of another pump. For example, in the case where the inter-cooler coolant pump 53 is stopped and the traction coolant pump 54 is operating, the inter-cooler coolant pump 53 allows a reverse flow so that the coolant discharged from the drive unit 2 or the motor-generator unit 6 does not flow to the second radiator 9 but flows to the I/C EGR system 50. There is thus the case where a route is traced circulating again to the traction coolant pump 54 via the branch point p1.

In order to prevent this, the inter-cooler coolant pump 53 is operated even though cooling is not required for the I/C EGR system 50, to the extent that the abovementioned reverse flow does not occur.

That is to say, even though the engine is stopped, the electric pump does not stop but continues to run for a fixed period. As a result, immediately after stopping, the intercooler and the EGR which are conventionally at a high temperature are rapidly cooled due to this operation so that the high temperature does not occur, thereby improving the life.

Similarly, the traction coolant pump 54 is operated even in the case where cooling is not required for the drive unit 2 and the motor-generator unit 6, to the extent that reverse flow of coolant does not occur.

Moreover, the high temperature battery 5 is always maintained at a predetermined temperature irrespective of whether the engine 3 is driving or the motor 2a is driving. The battery coolant pump 57 is operated corresponding to a temperature change of the high temperature battery 5 so that high temperature coolant which has been adjusted in flow quantity by the flow control valves 60 and 61, and low temperature coolant are mixed at the junction point p4 to thereby maintain the temperature of the coolant circulated to the battery 5 continuously at a predetermined temperature.

Here with the abovementioned embodiment, the example is given for a hybrid vehicle. However the vehicle is not limited to this and may be a standard vehicle.

With the present invention, since this is constructed as described above, then by using the high temperature coolant which has been heated by the engine waste heat as the heat source for warming up to the temperature range (80~90° C.) for the high temperature battery of the vehicle, temperature control of the high temperature battery can be performed without providing a special heater or a power source.

Moreover, by controlling the temperature of the coolant using the heating loop and the cooling loop, then the high temperature battery can be accurately controlled to the optimum temperature. Consequently miniaturization of the vehicle and energy savings can be achieved.

Furthermore, by using a plate type liquid heat exchanger which employs a liquid with a high specific heat capacity, then this can be smaller than the conventional commonly used heating and cooling units using air.

What is claimed is:

1. A gas temperature controller for vehicular battery comprising:
    a heat exchanger for removing waste heat from a vehicle engine;
    a heating loop, being a coolant circulation path, for carrying said waste heat from said heat exchanger to said vehicular battery, which is a high temperature battery, of a vehicle to heat said high temperature battery;
    a radiator for cooling said high temperature battery;
    a cooling loop, being a coolant circulation path, for carrying said waste heat from said high temperature battery to said radiator, and connected in parallel with said heating loop so as to have a common flow path with said heating loop; and
    flow control means having functions for controlling a temperature of a coolant, which is supplied to said high temperature battery through said heating loop, to a constant level by mixing a relatively low-temperature coolant in said cooling in said cooling loop with said coolant in said heating loop.

2. The temperature controller for a vehicular battery according to claim 1, wherein said flow control means are flow control valves provided in said heating loop and cooling loop.

3. The temperature controller for a vehicular battery according to claim 1, wherein said flow control means is a three way valve provided at a junction portion of said heating and said cooling loop.

4. The temperature controller for a vehicular battery according to claim 1, wherein said heat exchanger is a liquid heat exchanger.

5. The temperature controller for a vehicular battery according to claim 1, wherein said heat exchanger is a liquid heat exchanger.

6. The temperature controller for a vehicular battery according to claim 3, wherein said heat exchanger is a liquid heat exchanger.

* * * * *

UNITED STATES PATENT AND TRADEMARK OFFICE
CERTIFICATE OF CORRECTION

PATENT NO. : 6,394,210 B2  Page 1 of 1
DATED : May 28, 2002
INVENTOR(S) : Matsuda et al.

It is certified that error appears in the above-identified patent and that said Letters Patent is hereby corrected as shown below:

<u>Title page,</u>
The Notice should read:

-- (*)  Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days. --

Signed and Sealed this

Twenty-second Day of October, 2002

Attest:

JAMES E. ROGAN
Attesting Officer     Director of the United States Patent and Trademark Office